United States Patent
Chen et al.

(10) Patent No.: US 11,494,405 B2
(45) Date of Patent: Nov. 8, 2022

(54) LOCK CONTENTION RESOLUTION FOR ACTIVE-ACTIVE REPLICATION PERFORMED IN CONJUNCTION WITH JOURNAL RECOVERY

(71) Applicant: EMC IP Holding Company LLC, Hopkinton, MA (US)

(72) Inventors: Xiangping Chen, Sherborn, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 168 days.

(21) Appl. No.: 17/128,419

(22) Filed: Dec. 21, 2020

(65) Prior Publication Data

US 2022/0197924 A1     Jun. 23, 2022

(51) Int. Cl.
*G06F 16/27*      (2019.01)
*G06F 11/14*      (2006.01)
(Continued)

(52) U.S. Cl.
CPC .............. *G06F 16/27* (2019.01); *G06F 9/524* (2013.01); *G06F 11/1464* (2013.01);
(Continued)

(58) Field of Classification Search
CPC .. G06F 16/27; G06F 16/2343; G06F 16/2365; G06F 9/524; G06F 11/1464; G06F 2201/805
(Continued)

(56) References Cited

U.S. PATENT DOCUMENTS 6,298,345 B1 * 10/2001  Armstrong, Jr. ..... G06F 11/1471
7,165,155 B1    1/2007  Duprey et al.
(Continued)

FOREIGN PATENT DOCUMENTS

WO      2016111954 A1     7/2016
WO  PCT/US2019/024885     1/2020
(Continued)

OTHER PUBLICATIONS

EMC Corporation, "Introduction to the EMC XtremIO Storage Array (Ver. 4.0): A Detailed Review," White Paper, Apr. 2015, 65 pages.
(Continued)

*Primary Examiner* — Robert W Beausoliel, Jr.
*Assistant Examiner* — Arthur Ganger
(74) *Attorney, Agent, or Firm* — Ryan, Mason & Lewis, LLP

(57) ABSTRACT

An apparatus in one embodiment includes at least one processing device comprising a processor coupled to a memory, with the at least one processing device being configured to maintain a replication journal for recording replication write requests in a storage system, to detect a failure impacting the replication journal, and to initiate recovery of the replication journal responsive to the detected failure. In conjunction with the recovery of the replication journal, the at least one processing device is further configured to maintain a lock contention table that characterizes lock contentions between address lock ranges required for the recovery of the replication journal and address lock ranges required by other write requests in the storage system, and to utilize the lock contention table to resolve one or more potential deadlocks that would otherwise prevent completion of the recovery of the replication journal. Other
(Continued)

embodiments include methods and computer program products.

20 Claims, 7 Drawing Sheets

(51) Int. Cl.
    *G06F 16/23*     (2019.01)
    *G06F 9/52*     (2006.01)

(52) U.S. Cl.
    CPC ...... *G06F 16/2343* (2019.01); *G06F 16/2365* (2019.01); *G06F 2201/805* (2013.01)

(58) Field of Classification Search
    USPC ........................................................ 707/626
    See application file for complete search history.

(56) References Cited

U.S. PATENT DOCUMENTS

| | | |
|---|---|---|
| 7,440,982 B2 | 10/2008 | Lu et al. |
| 7,444,464 B2 | 10/2008 | Urmston et al. |
| 8,095,726 B1 | 1/2012 | O'Connell et al. |
| 8,214,612 B1 | 7/2012 | Natanzon |
| 8,301,593 B2 | 10/2012 | Hoffmann et al. |
| 8,335,899 B1 | 12/2012 | Meiri et al. |
| 9,104,326 B2 | 8/2015 | Frank et al. |
| 9,208,162 B1 | 12/2015 | Hallak et al. |
| 9,286,003 B1 | 3/2016 | Hallak et al. |
| 9,514,014 B2 | 12/2016 | Webman et al. |
| 9,552,258 B2 | 1/2017 | Hallak et al. |
| 9,606,870 B1 | 3/2017 | Meiri et al. |
| 9,716,754 B2 | 7/2017 | Swift |
| 9,891,994 B1 | 2/2018 | Schneider et al. |
| 10,176,046 B1 | 1/2019 | Hu et al. |
| 10,261,693 B1 | 4/2019 | Schneider et al. |
| 10,324,640 B1 | 6/2019 | Chen et al. |
| 10,338,851 B1 | 7/2019 | Kronrod et al. |
| 10,359,965 B1 | 7/2019 | Strange et al. |
| 10,394,485 B1 | 8/2019 | Chen et al. |
| 10,437,501 B1 | 10/2019 | Kucherov et al. |
| 10,437,855 B1 | 10/2019 | Strange et al. |
| 10,466,925 B1 | 11/2019 | Blanco et al. |
| 10,496,324 B2 | 12/2019 | Meiri et al. |
| 10,496,489 B1 | 12/2019 | Chen et al. |
| 10,496,672 B2 | 12/2019 | Meiri et al. |
| 10,558,613 B1 | 2/2020 | Shveidel et al. |
| 10,592,159 B2 | 3/2020 | Kucherov et al. |
| 10,592,161 B1 | 3/2020 | Chen et al. |
| 10,606,519 B1 | 3/2020 | Shveidel |
| 10,635,533 B2 | 4/2020 | Schneider et al. |
| 10,684,915 B2 | 6/2020 | Schneider et al. |
| 10,691,355 B2 | 6/2020 | Kucherov et al. |
| 10,691,373 B2 | 6/2020 | Harduf et al. |
| 10,691,551 B2 | 6/2020 | Meiri et al. |
| 10,698,772 B2 | 6/2020 | Hu et al. |
| 10,705,965 B2 | 7/2020 | Shveidel et al. |
| 10,719,253 B2 | 7/2020 | Alkalay et al. |
| 10,725,855 B2 | 7/2020 | Shani et al. |
| 10,754,559 B1 | 8/2020 | Meiri et al. |
| 10,754,575 B2 | 8/2020 | Strange |
| 10,754,736 B2 | 8/2020 | Shani et al. |
| 10,761,933 B2 | 9/2020 | Moore et al. |
| 10,783,038 B2 | 9/2020 | Moore et al. |
| 10,817,385 B2 | 10/2020 | Meiri et al. |
| 10,824,512 B2 | 11/2020 | Resnik et al. |
| 10,826,990 B2 | 11/2020 | Kamran et al. |
| 10,831,407 B2 | 11/2020 | Glimcher et al. |
| 10,831,735 B2 | 11/2020 | Schneider et al. |
| 10,838,863 B2 | 11/2020 | Kamran et al. |
| 10,846,178 B2 | 11/2020 | Meiri |
| 10,852,965 B2 | 12/2020 | Glimcher et al. |
| 10,852,974 B2 | 12/2020 | Kucherov et al. |
| 10,852,999 B2 | 12/2020 | Schneider et al. |
| 10,860,234 B2 | 12/2020 | Strange et al. |
| 10,860,241 B2 | 12/2020 | Meiri et al. |
| 2007/0022121 A1 | 1/2007 | Bahar et al. |
| 2008/0279462 A1 | 11/2008 | Celi, Jr. |
| 2009/0132955 A1 | 5/2009 | Garg et al. |
| 2009/0276593 A1 | 11/2009 | Jacobson et al. |
| 2010/0179941 A1 | 7/2010 | Agrawal et al. |
| 2011/0022566 A1 | 1/2011 | Beaverson et al. |
| 2011/0087633 A1* | 4/2011 | Kreuder ............. G06F 16/273 707/610 |
| 2011/0225123 A1 | 9/2011 | D'Souza et al. |
| 2012/0124282 A1 | 5/2012 | Frank et al. |
| 2013/0305002 A1 | 11/2013 | Hallak et al. |
| 2013/0325824 A1 | 12/2013 | Shoens |
| 2014/0181016 A1 | 6/2014 | Whitehead et al. |
| 2014/0244935 A1 | 8/2014 | Ezra et al. |
| 2015/0378766 A1 | 12/2015 | Beveridge et al. |
| 2015/0378785 A1 | 12/2015 | Tarasuk-Levin et al. |
| 2016/0150012 A1 | 5/2016 | Barszczak et al. |
| 2016/0170987 A1 | 6/2016 | Kesselman |
| 2016/0202927 A1 | 7/2016 | Klarakis et al. |
| 2016/0224259 A1 | 8/2016 | Ahrens et al. |
| 2016/0261513 A1 | 9/2016 | Aingaran et al. |
| 2016/0345207 A1 | 11/2016 | Kwak et al. |
| 2017/0075842 A1 | 3/2017 | Su et al. |
| 2017/0185529 A1 | 6/2017 | Chhabra et al. |
| 2017/0192857 A1 | 7/2017 | Meiri et al. |
| 2018/0095873 A1 | 4/2018 | Nakagoe et al. |
| 2019/0303490 A1 | 10/2019 | Chen et al. |
| 2019/0370354 A1 | 12/2019 | Kucherov et al. |
| 2019/0370355 A1 | 12/2019 | Kucherov et al. |
| 2019/0370356 A1 | 12/2019 | Kucherov et al. |
| 2019/0370357 A1 | 12/2019 | Kucherov et al. |
| 2019/0392060 A1 | 12/2019 | Meiri et al. |
| 2020/0026616 A1 | 1/2020 | Hu et al. |
| 2020/0097174 A1 | 3/2020 | Moore et al. |
| 2020/0097363 A1 | 3/2020 | Moore et al. |
| 2020/0097393 A1 | 3/2020 | Moore et al. |
| 2020/0125276 A1 | 4/2020 | Shani et al. |
| 2020/0218601 A1 | 7/2020 | Schneider et al. |
| 2020/0218610 A1 | 7/2020 | Schneider et al. |
| 2020/0225849 A1 | 7/2020 | Meiri et al. |
| 2020/0226023 A1 | 7/2020 | Meiri |
| 2020/0226145 A1 | 7/2020 | Meiri |
| 2020/0233704 A1 | 7/2020 | Alkalay et al. |
| 2020/0233705 A1 | 7/2020 | Alkalay et al. |
| 2020/0233881 A1 | 7/2020 | Harduf et al. |
| 2020/0242130 A1 | 7/2020 | Chen et al. |
| 2020/0249868 A1 | 8/2020 | Glimcher et al. |
| 2020/0249869 A1 | 8/2020 | Glimcher et al. |
| 2020/0250089 A1 | 8/2020 | Kamran et al. |
| 2020/0250144 A1 | 8/2020 | Natanzon et al. |
| 2020/0272542 A1 | 8/2020 | Meiri et al. |
| 2020/0272600 A1 | 8/2020 | Natanzon et al. |
| 2020/0285268 A1 | 9/2020 | Meiri et al. |
| 2020/0285402 A1 | 9/2020 | Meiri et al. |
| 2020/0293499 A1* | 9/2020 | Kohli ............. G06F 3/0604 |
| 2020/0301784 A1 | 9/2020 | Chen |
| 2020/0310649 A1 | 10/2020 | Chen et al. |
| 2020/0310654 A1 | 10/2020 | Meiri et al. |
| 2020/0326877 A1 | 10/2020 | Chen et al. |
| 2020/0327024 A1 | 10/2020 | Alkalay et al. |
| 2020/0341641 A1 | 10/2020 | Kucherov et al. |
| 2020/0341682 A1 | 10/2020 | Kucherov et al. |
| 2020/0341749 A1 | 10/2020 | Bash et al. |
| 2020/0364106 A1 | 11/2020 | Chen et al. |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

(56) References Cited

OTHER PUBLICATIONS

EMC Corporation, "Introduction to XtremIO Virtual Copies," White Paper, Mar. 2016, 39 pages.
EMC Corporation, "XtremIO Data Protection (XDP): Flash-Specific Data Protection, Provided by XtremIO (Ver. 4.0)," White Paper, Apr. 2015, 25 pages.
Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
EMC Corporation, "High Availability, Data Protection and Data Integrity in the XtremIO Architecture," White Paper, Apr. 2015, 28 pages.
Dell EMC, "Introduction to Dell EMC XtremIO X2 Storage Array—A Detailed Review," Dell EMC White Paper, Aug. 2017, 46 pages.
N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
Dell EMC, "Introduction to Dell EMC XtremIO X2 Storage Array—A Detailed Review," Dell EMC White Paper, Apr. 2018, 52 pages.
Dell EMC, "Introduction to XtremIO Metadata-Aware Replication," Dell EMC White Paper, Apr. 2018, 18 pages.
Dell EMC, "PowerMax OS," Dell EMC PowerMax Family Product Guide, May 2019, 192 pages.
Dell EMC, "Dell EMC VxRack FLEX," Dell EMC Product Overview, 2018, 5 pages.
U.S. Appl. No. 15/662,708 filed in the name of Xiangping Chen et al., filed Jul. 28, 2017, and entitled "Token-Based Data Flow Control in a Clustered Storage System."
U.S. Appl. No. 15/793,121 filed in the name of David Meiri et al., filed Oct. 25, 2017, and entitled "Opportunistic Compression of Replicated Data in a Content Addressable Storage System."
U.S. Appl. No. 15/824,536 filed in the name of Christopher Sayles et al., filed Nov. 28, 2017, and entitled "Storage System with Asynchronous Messaging between Processing Modules for Data Replication."
U.S. Appl. No. 16/343,942 filed in the name of Yonatan Shtarkman et al., filed Apr. 22, 2019, and entitled "Snapshot-Enabled Storage System Implementing Algorithm for Efficient Reclamation of Snapshot Storage Space."
U.S. Appl. No. 16/343,949 filed in the name of Asaf Porath et al., filed Apr. 22, 2019, and entitled "Snapshot-Enabled Storage System Implementing Algorithm for Efficient Reading of Data from Stored Snapshots."
U.S. Appl. No. 16/530,121 filed in the name of Anton Kucherov et al., filed Aug. 2, 2019, and entitled "Memory-Efficient Processing of Raid Metadata Bitmaps."
U.S. Appl. No. 16/663,524 filed in the name of Xiangping Chen et al., filed Oct. 25, 2019, and entitled "Storage System with Throughput-Based Timing of Synchronous Replication Recovery."
U.S. Appl. No. 16/665,651 filed in the name of Lior Kamran et al., filed Oct. 28, 2019, and entitled "Recovery Flow with Reduced Address Lock Contention in a Content Addressable Storage System."
U.S. Appl. No. 16/671,824 filed in the name of Lior Kamran et al., filed Nov. 1, 2019, and entitled "Storage System Capacity Expansion Using Mixed-Capacity Storage Devices."
U.S. Appl. No. 16/693,858 filed in the name of Doron Tai, filed Nov. 25, 2019, and entitled "Storage System with Prioritized RAID Rebuild."
U.S. Appl. No. 16/654,225 filed in the name of Svetlana Kronrod et al., filed Oct. 16, 2019, and entitled "Storage System with Efficient Release of Address Lock Waiters During Synchronous Replication."
NVM Express, "NVM Express, Revision 1.3," NVM Express, May 1, 2017, 282 pages.

* cited by examiner

| LOCK CONTENTION TABLE | | |
|---|---|---|
| ENTRY 1 | LOCK CONTENTION RANGE 1 | JOURNAL ENTRY INFO | OTHER FIELDS |
| ENTRY 2 | LOCK CONTENTION RANGE 2 | JOURNAL ENTRY INFO | OTHER FIELDS |
| ... | | |
| ENTRY K | LOCK CONTENTION RANGE K | JOURNAL ENTRY INFO | OTHER FIELDS |

FIG. 3B

LOCK CONTENTION RESOLUTION FOR ACTIVE-ACTIVE REPLICATION PERFORMED IN CONJUNCTION WITH JOURNAL RECOVERY

FIELD

The field relates generally to information processing systems, and more particularly to storage in information processing systems.

BACKGROUND

Conventional storage systems are often configured to utilize multiple journals of different types in conjunction with processing of input-output (TO) requests, such as write requests and/or read requests, received from one or more host devices over a network in an information processing system. For example, journals can be used to account for requests that are currently being processed in a given storage system, also commonly referred to as "in-flight" requests. The journals can be used to recover and replay these "in-flight" requests if necessary. However, problems can arise in conventional storage systems when failures occur during active-active replication. In order to ensure high availability (HA) of the storage system, it is generally desirable to perform journal recovery as quickly as possible. In situations in which active-active replication is ongoing during replication journal recovery, various types of potential deadlocks can arise that are not adequately resolved by current techniques, thereby preventing proper completion of the journal recovery process. This can adversely impact the ability of the storage system to respond to the failure and meet its HA goals.

SUMMARY

Illustrative embodiments disclosed herein address the above-noted problems by providing improved techniques for lock contention resolution for active-active replication performed in conjunction with replication journal recovery.

Such embodiments can avoid potential deadlocks that might otherwise negatively impact the ability of the storage system to respond to a failure. As a result, the storage system can more readily achieve its HA goals.

For example, illustrative embodiments advantageously allow a storage system to continue handling active-active replication IO requests during an HA event, without "tripping" or otherwise interrupting the active-active replication, while also efficiently avoiding potential deadlocks in replication journal recovery, thereby ensuring fast recovery from the HA event. Moreover, such embodiments do not undermine the performance of the storage system in handling normal IO requests not related to active-active replication, or in handling active-active replication IO requests in the absence of any HA events.

These embodiments illustratively include a clustered implementation of a content addressable storage system having a distributed storage controller. Similar advantages can be provided in other types of storage systems.

In one embodiment, an apparatus includes at least one processing device comprising a processor coupled to a memory, with the at least one processing device being configured to maintain a replication journal for recording replication write requests in a storage system, to detect a failure impacting the replication journal, and to initiate recovery of the replication journal responsive to the detected failure.

In conjunction with the recovery of the replication journal, the at least one processing device is further configured to maintain a lock contention table that characterizes lock contentions between address lock ranges required for the recovery of the replication journal and address lock ranges required by other write requests in the storage system, and to utilize the lock contention table to resolve one or more potential deadlocks that would otherwise prevent completion of the recovery of the replication journal.

In some embodiments, the at least one processing device comprises at least a portion of a storage controller of a first storage system, with the first storage system being configured to participate in a replication process with a second storage system. In such an arrangement, the replication write requests are generated as part of the replication process.

The first and second storage systems are illustratively arranged in an active-active configuration relative to one another for performance of the replication process, although other arrangements are possible.

In some embodiments, the at least one processing device comprises a particular one of a plurality of storage nodes of a distributed storage system, with each such storage node comprising a set of processing modules configured to communicate with corresponding sets of processing modules on other ones of the storage nodes, and the sets of processing modules of the storage nodes of the distributed storage system collectively comprising at least a portion of a distributed storage controller of the distributed storage system.

In such an arrangement, different instances of the lock contention table are illustratively maintained by different ones of the processing modules of the sets of processing modules of the respective storage nodes of the distributed storage system.

Numerous other clustered and non-clustered storage system arrangements are possible in other embodiments.

In some embodiments, maintaining the replication journal illustratively comprises creating a journal entry in the replication journal for a given one of the replication write requests responsive to data of the write request being persisted in a first storage system that receives the write request from a host device, and removing the journal entry in the replication journal for the given one of the replication write requests responsive to data of the write request being persisted in a second storage system that receives the data from the first storage system. Other types of replication journals and replication journal maintenance techniques may be used in other embodiments.

In some embodiments, initiating recovery of the replication journal illustratively comprises acquiring address locks needed to apply journal entries of the replication journal, and performing a replication journal recovery operation by sending a replication write request associated with a selected one of the journal entries from a first storage system to a second storage system. Responsive to the detected failure, normal processing of other write requests may be temporarily interrupted until the address locks needed to apply journal entries of the replication journal are acquired.

In some embodiments, maintaining a lock contention table illustratively comprises determining whether or not the second storage system rejects the replication write request due to a lock collision, and responsive to an affirmative determination, releasing the corresponding lock and updating the lock contention table to include a table entry comprising a lock contention range and journal entry information for the selected journal entry. The journal entry information associated with the lock contention range in the lock contention table illustratively comprises at least an offset and a length for the corresponding replication write request.

In some embodiments, performing a replication journal recovery operation by sending a replication write request associated with a selected one of the journal entries, determining whether or not the second storage system rejects the replication write request due to a lock collision, and responsive to an affirmative determination, releasing the corresponding lock and updating the lock contention table to include a table entry comprising a lock contention range and journal entry information for the selected journal entry, are repeated for each of one or more additional selected journal entries in the replication journal. The repeating illustratively continues until all journal entries have been selected and processed and the lock contention table is empty.

In some embodiments, utilizing the lock contention table to resolve one or more potential deadlocks that would otherwise prevent completion of the recovery of the replication journal comprises, for a given one of the other write requests, determining whether or not it has a target data range that at least partially matches a lock contention range in a table entry of the lock contention table. Responsive to the given other write request having a target data range that at least partially matches a lock contention range in a table entry of the lock contention table, a data range is checked in a corresponding journal entry of the replication journal. Responsive to a full match between the target data range and the data range in the corresponding journal entry, both the table entry for that lock contention range and the corresponding journal entry are cleared. Responsive to a partial match between the target data range and the data range in the corresponding journal entry, the corresponding journal entry is modified to include only a non-matching portion of the data range.

Some illustrative embodiments utilize the lock contention table to resolve one or more potential deadlocks that would otherwise prevent completion of the recovery of the replication journal by selectively aborting portions of the recovery of the replication journal based at least in part on one or more table entries of the lock contention table. This is done in a manner that maintains write order consistency and cross-site consistency for first and second storage systems participating in an active-active replication process.

These and other illustrative embodiments include, without limitation, apparatus, systems, methods and processor-readable storage media.

BRIEF DESCRIPTION OF THE DRAWINGS

FIGS. 3A and 3B show respective examples of a replication journal and a lock contention table utilized in implementing lock contention resolution for active-active replication performed in conjunction with replication journal recovery in accordance with the FIG. 2 process.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
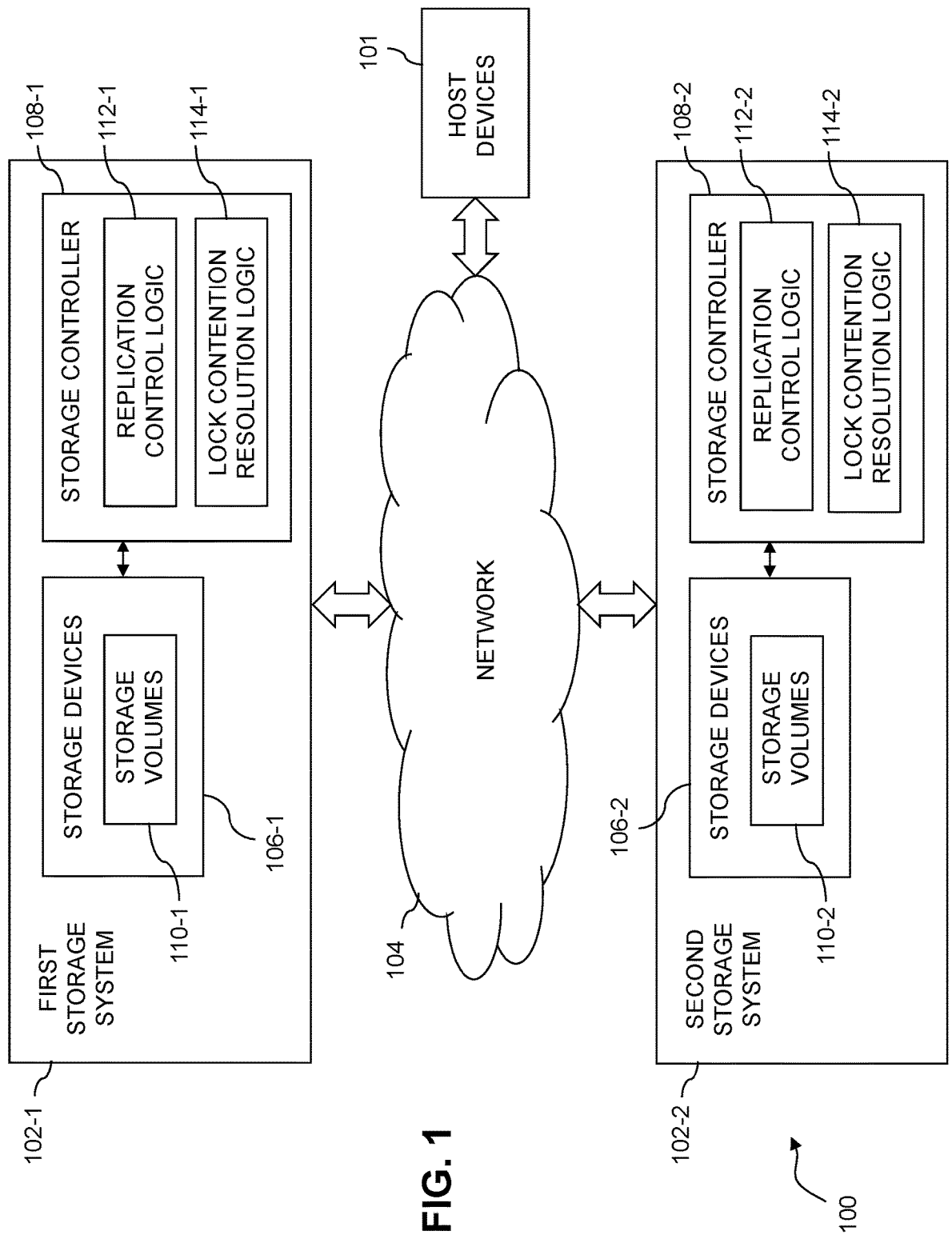
FIG. 1 is a block diagram of an information processing system comprising first and second storage systems configured with functionality for lock contention resolution for active-active replication performed in conjunction with replication journal recovery in an illustrative embodiment.

FIG. 1 shows an information processing system 100 configured in accordance with an illustrative embodiment. The information processing system 100 comprises a plurality of host devices 101, a first storage system 102-1 and a second storage system 102-2, all of which are configured to communicate with one another over a network 104. The first and second storage systems 102 are more particularly configured in this embodiment to participate in an active-active replication process in which host writes are mirrored between the first storage system 102-1 and the second storage system 102-2, possibly with involvement of at least one of the host devices 101. The one or more storage volumes that are mirrored between the first and second storage systems 102 using the active-active replication process are illustratively part of a designated consistency group.

Each of the storage systems 102 is illustratively associated with a corresponding set of one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices. Such applications illustratively generate input-output (IO) operations that are processed by a corresponding one of the storage systems 102. The term "input-output" as used herein refers to at least one of input and output. For example, IO operations may comprise write requests and/or read requests directed to logical addresses of a particular logical storage volume of a given one of the storage systems 102. These and other types of IO operations are also generally referred to herein as IO requests.

The storage systems 102 illustratively comprise respective processing devices of one or more processing platforms.

For example, the storage systems 102 can each comprise one or more processing devices each having a processor and a memory, possibly implementing virtual machines and/or containers, although numerous other configurations are possible.

The storage systems 102 can additionally or alternatively be part of cloud infrastructure such as an Amazon Web Services (AWS) system. Other examples of cloud-based systems that can be used to provide at least portions of the storage systems 102 include Google Cloud Platform (GCP) and Microsoft Azure.

The storage systems 102 may be implemented on a common processing platform, or on separate processing platforms.

The host devices 101 are illustratively configured to write data to and read data from the storage systems 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The first storage system 102-1 comprises a plurality of storage devices 106-1 and an associated storage controller 108-1. The storage devices 106-1 store storage volumes 110-1. The storage volumes 110-1 illustratively comprise respective logical units (LUNs) or other types of logical storage volumes.

Similarly, the second storage system 102-2 comprises a plurality of storage devices 106-2 and an associated storage controller 108-2. The storage devices 106-2 store storage volumes 110-2, at least a portion of which represent respective LUNs or other types of logical storage volumes that are replicated between the first storage system 102-1 and the second storage system 102-2 in accordance with an active-active replication process.

The storage devices 106 of the storage systems 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, at least one of the storage systems 102 illustratively comprises a scale-out all-flash content addressable storage array such as an XtremIO™ storage array from Dell Technologies. A wide variety of other types of storage arrays can be used in implementing a given one of the storage systems 102 in other embodiments, including by way of example one or more Unity™ or PowerMax™ storage arrays, commercially available from Dell Technologies. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage systems 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage systems 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage controller 108-1 of first storage system 102-1 in the FIG. 1 embodiment includes replication control logic 112-1 and lock contention resolution logic 114-2. It can also include additional elements, such as a signature generator for generating content-based signatures of respective data pages.

Similarly, the storage controller 108-2 of second storage system 102-2 includes replication control logic 112-2 and lock contention resolution logic 114-2. The storage controller 108-2, like the storage controller 108-1, can also include additional elements, such as a signature generator for generating content-based signatures of respective data pages.

The instances of replication control logic 112-1 and 112-2 are collectively referred to herein as replication control logic 112. Such replication control logic instances are also referred to herein as individually or collectively comprising at least a portion of a "replication engine" of the system 100.

The replication control logic 112 of the storage systems 102 controls performance of an active-active replication process carried out between those storage systems, which as noted above in some embodiments further involves at least one of the host devices 101. The data that is replicated between the first storage system 102-1 and the second storage system 102-2 can include all of the data stored in the first and second storage systems 102, or only certain designated subsets of the data stored in the first and second storage system 102, such as particular designated sets of LUNs or other logical storage volumes. Different replication processes of different types can be implemented for different parts of the stored data.

A given storage volume designated for active-active replication between the first storage system 102-1 and the second storage system 102-2 illustratively comprises a set of one or more LUNs or other instances of the storage volumes 110-1 of the first storage system 102-1. Each such LUN or other storage volume on the first storage system 102-1 illustratively comprises at least a portion of a physical storage space of one or more of the storage devices 106-1. The corresponding replicated LUN or other storage volume of the storage volumes 110-2 of the second storage system 102-2 illustratively comprises at least a portion of a physical storage space of one or more of the storage devices 106-2.

Figure 2:
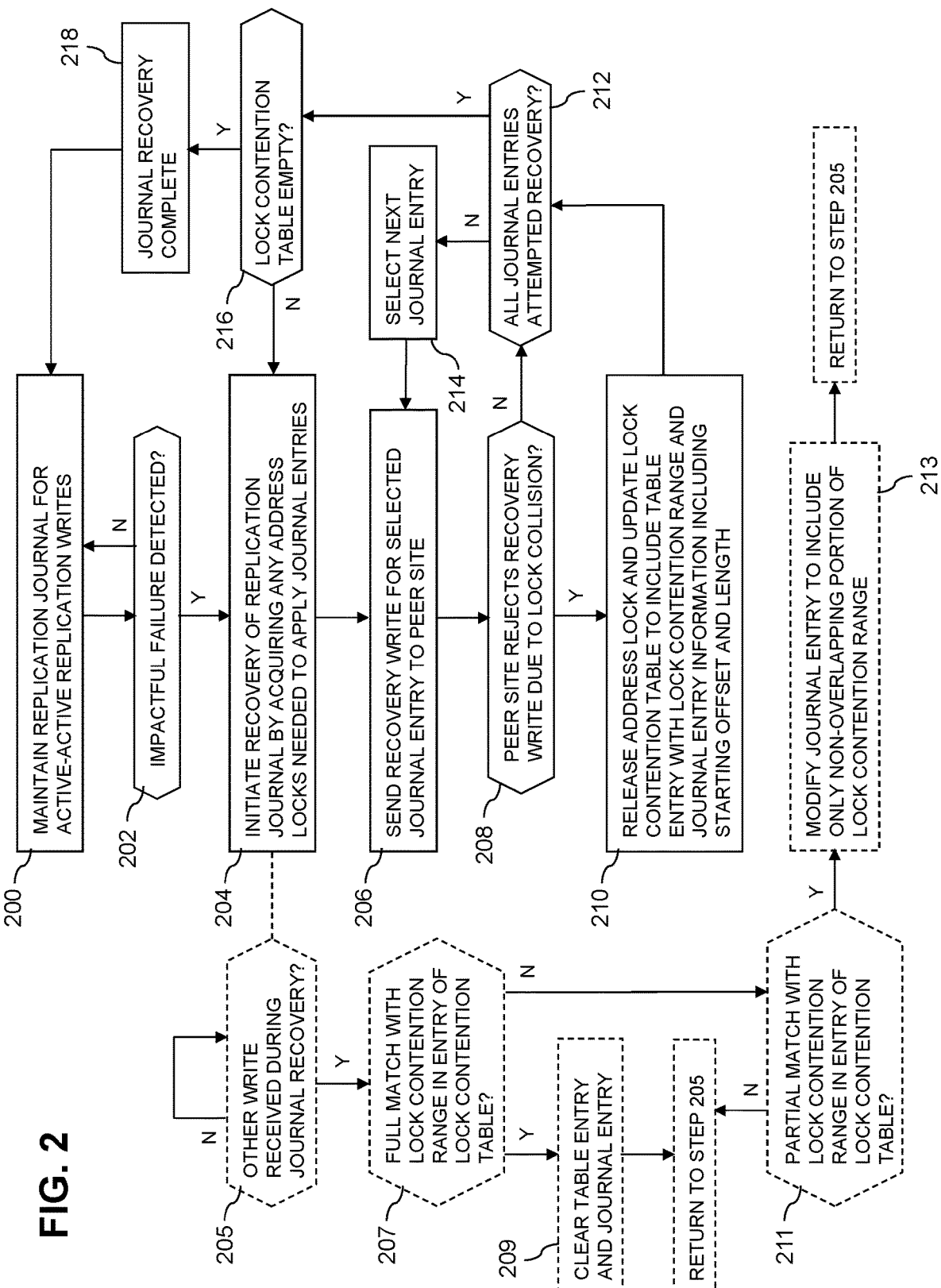
FIG. 2 is a flow diagram of a process for lock contention resolution for active-active replication performed in conjunction with replication journal recovery in an illustrative embodiment.

The lock contention resolution logic 114 of the storage systems 102 is illustratively configured to control the performance of a process for lock contention resolution for active-active replication performed in conjunction with replication journal recovery, such as that shown in the flow diagram of FIG. 2. At least one of the host devices 101 in some embodiments can also include one or more instances of lock contention resolution logic and possibly also one or more instances of replication control logic and one or more signature generators.

The storage controllers 108 of the storage systems 102 should also be understood to include additional modules and other components typically found in conventional implementations of storage controllers and storage systems, although such additional modules and other components are omitted from the figure for clarity and simplicity of illustration.

It will be assumed for the following description of the FIG. 1 embodiment that there is an ongoing active-active replication process being carried out between the first storage system 102-1 and the second storage system 102-2 in the system 100, utilizing their respective instances of replication control logic 112-1 and 112-2. The first and second storage systems 102 are therefore assumed to be arranged in an active-active configuration relative to one another for performance of the replication process.

For example, in some active-active configurations, one of the storage systems illustratively operates as a "leader" relative to another one of the storage systems operating as a "follower," and each storage system can take on the leader role for writes that it receives from the host devices 101, and the follower role for writes received by the other storage system from the host devices 101, so as to support consistent writes to both storage systems. In such an active-active configuration, each of the storage systems can operate as a primary storage system relative to the other storage system, leading to potential lock contentions that cannot be readily resolved using conventional techniques.

The system 100 is illustratively configured to provide what is referred to herein as "lock contention resolution during replication journal recovery." For example, such lock contention resolution during replication journal recovery is illustratively performed as part of active-active replication carried out between the first storage system 102-1 and the second storage system 102-2. These and other operations related to lock contention resolution during replication journal recovery as disclosed herein are illustratively implemented at least in part by or otherwise under the control of the first and second instances of lock contention resolution logic 114-1 and 114-2. One or more such operations can be additionally or alternatively controlled by one or more other system components in other embodiments.

In accordance with the functionality for lock contention resolution during replication journal recovery, the first storage system 102-1 is configured to maintain a replication journal for recording replication write requests, to detect a failure impacting the replication journal, and to initiate recovery of the replication journal responsive to the detected failure. In conjunction with the recovery of the replication journal, the first storage system 102-1 is further configured to maintain a lock contention table that characterizes lock contentions between address lock ranges required for the recovery of the replication journal and address lock ranges required by other write requests in the storage system 102-1, and to utilize the lock contention table to resolve one or more potential deadlocks that would otherwise prevent completion of the recovery of the replication journal.

The replication write requests recorded in the replication journal are illustratively generated as part of the above-described active-active replication process carried out between the first storage system 102-1 and the second storage system 102-2 using their respective instances of replication control logic 112-1 and 112-2. Replication write requests are also referred to herein as simply "replication writes."

Illustrative examples of a replication journal and a lock contention table utilized in some embodiments herein are shown in respective FIGS. 3A and 3B and will be described in more detail below.

As indicated previously, each of the storage systems 102 can serve as a primary storage system relative to the other in the active-active replication process, for writes received by that storage system from the host devices 101. Accordingly, it is to be understood that operations described herein as being performed by storage system 102-1 relative to storage system 102-2, are similarly performed by storage system 102-2 relative to storage system 102-1, in accordance with their active-active configuration. For example, each of the storage systems 102 illustratively maintains its own replication journal and lock contention table.

In some embodiments, the first and second storage systems 102 comprise respective distributed storage systems, each having a plurality of storage nodes, with each such storage node comprising a set of processing modules configured to communicate with corresponding sets of processing modules on other ones of the storage nodes, and the sets of processing modules of the storage nodes of the distributed storage system collectively comprising at least a portion of a distributed storage controller of the distributed storage system.

In such an arrangement, different instances of at least one of the replication journal and the lock contention table of a given distributed storage system are illustratively maintained by different ones of the processing modules of the sets of processing modules of the respective storage nodes of that distributed storage system.

A failure of a given one of the above-noted processing modules is an example of one type of HA event that must be dealt with in order to ensure that the HA goals of the storage system are achieved.

Numerous other clustered and non-clustered storage system arrangements are possible in other embodiments.

In some embodiments, maintaining the replication journal illustratively comprises the first storage system 102-1 creating a journal entry in the replication journal for a given one of the replication write requests responsive to data of the write request being persisted in first storage system 102-1 that receives the write request from one of the host devices 101, and removing the journal entry in the replication journal for the given one of the replication write requests responsive to data of the write request being persisted in the second storage system 102-2 that receives the data from the first storage system 102-1. Other types of replication journals and replication journal maintenance techniques may be used in other embodiments.

In some embodiments, initiating recovery of the replication journal illustratively comprises the first storage system 102-1 acquiring address locks needed to apply journal entries of the replication journal, and the first storage system 102-1 performing a replication journal recovery operation by sending a replication write request associated with a selected one of the journal entries to the second storage system 102-2. Responsive to the detected failure, normal processing of other write requests may be temporarily interrupted in the first storage system 102-1 until the address locks needed to apply journal entries of the replication journal are acquired. Each such address lock illustratively locks a particular designated address range, with the address range illustratively comprising a range of logical block addresses or LBAs. Other types of address locks can be used in other embodiments.

In some embodiments, maintaining a lock contention table illustratively comprises the first storage system 102-1 determining whether or not the second storage system 102-2 rejects the replication write request due to a lock collision, and responsive to an affirmative determination, the first storage system 102-1 releasing the corresponding lock and updating the lock contention table to include a table entry comprising a lock contention range and journal entry information for the selected journal entry. The journal entry information associated with the lock contention range in the lock contention table illustratively comprises at least an offset and a length for the corresponding replication write request.

In some embodiments, performing a replication journal recovery operation by sending a replication write request associated with a selected one of the journal entries, determining whether or not the second storage system rejects the replication write request due to a lock collision, and responsive to an affirmative determination, releasing the corresponding lock and updating the lock contention table to include a table entry comprising a lock contention range and journal entry information for the selected journal entry, illustratively performed by first storage system 102-1, are repeated for each of one or more additional selected journal entries in the replication journal. The repeating illustratively continues until all journal entries have been selected and processed and the lock contention table is empty.

In some embodiments, utilizing the lock contention table to resolve one or more potential deadlocks that would otherwise prevent completion of the recovery of the replication journal comprises, for a given one of the other write requests, the first storage system 102-1 determining whether or not it has a target data range that at least partially matches a lock contention range in a table entry of the lock contention table. Responsive to the given other write request having a target data range that at least partially matches a lock contention range in a table entry of the lock contention table, a data range is checked in a corresponding journal entry of the replication journal. Responsive to a full match between the target data range and the data range in the corresponding journal entry, both the table entry for that lock contention range and the corresponding journal entry are cleared. Responsive to a partial match between the target data range and the data range in the corresponding journal entry, the corresponding journal entry is modified to include only a non-matching portion of the data range.

Some illustrative embodiments utilize the lock contention table to resolve one or more potential deadlocks that would otherwise prevent completion of the recovery of the replication journal by selectively aborting portions of the recovery of the replication journal based at least in part on one or more table entries of the lock contention table. This is done in a manner that maintains write order consistency and cross-site consistency for first and second storage systems 102 participating in the active-active replication process.

As indicated previously, the above-noted functionality for lock contention resolution during replication journal recovery described with reference to first storage system 102-1 relative to second storage system 102-2 is similarly implemented in the second storage system 102-2 relative to the first storage system 102-1. The storage systems 102 in some embodiments therefore both implement substantially the same functionality for lock contention resolution during replication journal recovery via their respective instances of lock contention resolution logic 114-1 and 114-2.

The first and second storage systems 102 in some embodiments comprise respective content addressable storage systems in which logical addresses of data pages are mapped to physical addresses of the data pages using respective content-based signatures that are generated from those data pages.

The content-based signatures utilized in some embodiments illustratively comprise respective hash digests of respective data pages of a storage volume. A given one of the hash digests is generated in illustrative embodiments by applying a secure hashing algorithm to content of a corresponding one of the data pages of the storage volume. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

In some embodiments, various types of address metadata are utilized to provide content addressable storage functionality. The address metadata in some embodiments comprises at least a portion of one or more logical layer mapping tables that map logical addresses of respective ones of the data pages of a storage volume to corresponding content-based signatures of the respective data pages. Examples of logical layer mapping tables and other metadata structures maintained by at least the storage controller 108-2 of second storage system 102-2 will be described elsewhere herein.

As indicated previously, the instances of replication control logic 112-1 and 112-2 are assumed to cooperate to implement the active-active replication process, and in some embodiments collectively provide a replication engine of system 100. The active-active replication process illustratively replicates one or more logical storage volumes, sometimes collectively referred to as a consistency group, between the first and second storage systems 102.

The term "storage volume" as used herein is intended to be broadly construed, and should not be viewed as being limited to any particular format or configuration. The term "consistency group" as used herein is also intended to be broadly construed, and may comprise one or more storage volumes subject to active-active replication.

Also as mentioned above, one or both of the storage systems 102 are illustratively implemented as respective distributed storage systems, also referred to herein as clustered storage systems, in which each such storage system comprises a plurality of storage nodes each comprising a set of processing modules configured to communicate with corresponding sets of processing modules on other ones of the storage nodes. The sets of processing modules of the storage nodes of the first storage system collectively comprise at least a portion of the storage controller 108-1 or 108-2 of the storage system 102-1 or 102-2.

It is assumed in some embodiments that the processing modules of a distributed storage controller are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller of the type described above can include control modules, data modules, routing modules and at least one management module. These and possibly other modules of the distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

The management module communicates with the control modules, and the control modules communicate with the data modules. In some embodiments, each of the storage nodes of the distributed storage system comprises one of the control modules and one of the data modules, as well as one or more additional modules including one of the routing modules. A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Another example of a content addressable storage system configured to implement functionality for lock contention resolution during replication journal recovery will be described in conjunction with FIG. 4 below.

The processing modules of a given distributed storage controller as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table comprises a plurality of entries accessible utilizing logical addresses as respective keys, with each such entry of the A2H table comprising a corresponding one of the logical addresses, a corresponding one of the hash handles, and possibly one or more additional fields.

2. A hash-to-data ("H2D") table that illustratively comprises a plurality of entries accessible utilizing hash handles as respective keys, with each such entry of the H2D table comprising a corresponding one of the hash handles, a physical offset of a corresponding one of the data pages, and possibly one or more additional fields.

3. A hash metadata ("HMD") table illustratively comprising a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table that illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Again, the logical layer and physical layer mapping tables referred to above are examples only, and can be varied in other embodiments.

In some embodiments, certain ones of the above-described mapping tables are maintained by particular modules of a distributed storage controller. For example, the mapping tables maintained by the control modules illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The control modules may further comprise additional components such as respective messaging interfaces that are utilized by the control modules to generate control-to-routing messages for transmission to the routing modules, and to process routing-to-control messages received from the routing modules. Such messaging interfaces can also be configured to generate messages for transmission to the management module and to process instructions and other messages received from the management module.

The data modules comprise respective control interfaces. These control interfaces support communication between the data modules and corresponding ones of the control modules. Also included in the data modules are respective SSD interfaces. These SSD interfaces support communications with corresponding ones of the storage devices 106 of the distributed storage system.

The above-described processing module arrangements are presented by way of example only, and can be varied in other embodiments.

Additional illustrative embodiments will now be described with reference to an example algorithm for lock contention resolution during replication journal recovery. The assumptions made in conjunction with description of these embodiments below need not apply in other embodiments.

It is assumed in the context of this example algorithm and other illustrative embodiments herein that the address locks are utilized to guarantee atomicity for execution of IO requests in the storage systems 102. For example, a given processing module receiving a first IO request from another processing module will generally lock the address range targeted by the first IO request prior to performing the associated read or write operation. In this manner, if a second IO request arrives at the given processing module targeting at least a portion of the locked address range, the second IO request will be suspended in order to wait for the address lock to be released by the first IO request. The second IO request may be viewed as an example of what is more generally referred to herein as an "address lock waiter." It illustratively waits in a queue established for the corresponding "lock object" which may be a particular range of logical addresses that is subject to the corresponding address lock. The second IO request cannot resume until the address lock is released by the first IO request. There may be multiple IO requests that are suspended and waiting in the queue for a given address lock at any given time. Multiple such queues of address lock waiters and their associated address lock waiter release operations in some embodiments are implemented at least in part by operating system (OS) synchronization services of a distributed storage controller.

It should be noted in this regard that address lock granularity in a given storage system may be larger than the size of a particular IO request. For example, a storage system may have an address lock granularity of 16K, illustratively corresponding to a native page size in the storage system, while some IO requests may have a smaller size, such as 4K. It is therefore possible that several IO requests may be waiting to acquire lock for the same 16K address range even if those IO requests are directed to different addresses within that range.

The algorithm in the present example advantageously provides improved techniques for lock contention resolution for active-active replication performed in conjunction with replication journal recovery. Such embodiments can avoid potential deadlocks that might otherwise negatively impact the ability of the storage system to respond to a failure. As a result, the storage system can more readily achieve its HA goals.

As indicated previously, the replication journaling functionality of storage systems 102 is illustratively configured to allow in-flight replication write requests to be recovered after HA events. By way of example, in order to minimize the impact to normal IO during HA recovery, replication journal recovery is illustratively performed in two steps. In the first step, the storage system goes through all the replication journal entries and acquires address locks needed to apply journal entries. In the second step, the storage system permits host IO service, while performing the actual journal recovery. By performing two-step journal recovery, host IOs that do not have address conflicts with journal entries do not need to wait for journal recovery completion. However, host IOs that hit pages locked by the recovery process need to wait for the page recovery to complete.

The replication journal is also used to maintain data consistency of active-active replication IOs. A replication journal entry is illustratively created as soon as replication source persists the IO data, and is removed once data is safely transferred and persisted on the peer site. This replication journal is required in order to be able to know which pages may be written on one side and not the other. During HA recovery, the impacted storage system performs replication IO recovery the same way as described above. It works well as long as there is no address lock collision or overlapped in-flight writes with the peer site. However, if there is an address lock collision, there is a risk of a deadlock. For example, if the remote storage system is also handling an HA event, both may try to recover the same addresses.

In a normal operating mode, in the absence of any failures or other HA events, it is possible that a given one of the host devices 101 will send two simultaneous writes to the same page (e.g., to different parts of that page). If the two writes end up in different ones of the first and second storage systems 102, both storage systems need to lock the page, resulting in an address lock collision. This address lock collision may be resolved via a designated lock winner and loser approach, where one side is the assigned lock winner. Upon receiving a replication write IO, the winner acquires IO lock and waits indefinitely if the address range is already locked, while the loser attempts to acquire lock, and if the address range is already locked, rejects or retries the IO at a high level (e.g., after all locks have been released) and asks the peer site to retry, thus preventing deadlock from happening. Since the peer site does not acknowledge IO back to host during unlock and retry, write order dependency and cross-site replication data consistency are ensured during the entire process.

In an HA recovery mode, however, the system does not have the ability to unlock and retry replication IOs, as journal entry recovery is outside of host IO context. Once the address range lock is released, other host IOs could acquire the lock and perform new writes. Simply retrying journal replay later could overwrite the newer data thus violating the write order consistency. To further complicate matters, in some implementations, the granularity of the address lock may not be aligned with the IO address range.

Illustrative embodiments herein address these and other problems by selectively aborting the journal entry recovery in the case of lock collision, while maintaining the write order consistency and cross-site consistency, such that older data cannot overwrite newer data, and data on both sites will eventually be the same.

The above-noted example algorithm providing an enhanced journal recovery mechanism taking into account peer locking collisions and rejections in active-active replication illustratively includes the following steps:

1. Apply address locks to regions specified by replication journal entries.
2. Perform replication journal IO recovery by sending replication data to peer site.
3. If peer site rejects IO due to lock collision, release the lock, save the lock contention range in a hash table, and save a copy of journal information including the IO starting offset and length.
4. During journal recovery time, if a host IO or replication IO comes in, check the lock contention hash table created in Step 3. If there is a match, check the corresponding journal entry.
   (a) If the IO range fully matches, clear both lock contention entry and journal entry.
   (b) If the IO range overlaps but is not exactly the same, adjust the journal entry to store only the non-overlapped range.
5. Continue journal recovery until all journal entries have attempted recovery.
6. If the lock contention table is not empty, repeat from Step 1.
7. If all journal entries have recovered and the lock contention table is empty, mark journal recovery as complete.

Additional or alternative steps may be used in such an algorithm in other embodiments. Also, the ordering of the steps can be varied, and different portions of the algorithm can be performed at least in part in parallel with one another.

These and other operations associated with lock contention resolution during replication journal recovery are illustratively performed at least in part by or under the control of the lock contention resolution logic 114-1 of the first storage system 102-1. Again, similar operations relating to lock contention resolution during replication journal recovery are assumed to be performed in the second storage system 102-2 at least in part by or under the control of the lock contention resolution logic 114-2.

The above-described illustrative embodiments efficiently resolve address lock contentions that might otherwise arise between local and remote storage systems in an active-active configuration where the storage system at each site can operate as a primary storage system and initiate locking activity.

For example, the algorithm described above addresses the issue that upon a lock collision between local and remote sites, unlock and replay journal recovery would not work as there could be newer host IO or replication IO from the remote site that come in during the unlock and retry window, such that retry may accidentally overwrite newer data with older data, thus violating write order consistency.

These and other embodiments herein leverage the fact that both sites have replication journal recovery mechanisms, and the data from each site is mirrored to the other site. Accordingly, it is acceptable to have one site (the "loser" site) clear or otherwise abort journal replay upon lock collision, as the other site (the "winner" site) will manage to complete the data replication even upon lock collision or failure recovery.

Again, these and other particular features associated with the above-described algorithm are presented by way of illustrative example only, and need not be present in other embodiments disclosed herein.

The storage systems 102 in the FIG. 1 embodiment are assumed to be implemented using at least one processing platform, with each such processing platform comprising one or more processing devices, and each such processing device comprising a processor coupled to a memory. Such processing devices can illustratively include particular arrangements of compute, storage and network resources.

The storage systems 102 may be implemented on respective distinct processing platforms, although numerous other arrangements are possible. At least portions of their associated host devices may be implemented on the same processing platforms as the storage systems 102 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage systems 102 to reside in different data centers. Numerous other distributed implementations of the storage systems 102 and their respective associated sets of host devices are possible.

Additional examples of processing platforms utilized to implement storage systems and possibly their associated host devices in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, storage systems 102, network 104, storage devices 106, storage controllers 108, storage volumes 110, replication control logic 112 and lock contention resolution logic 114 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, at least portions of the functionality for lock contention resolution during replication journal recovery can be implemented in one or more host devices, operating in cooperation with first and second storage systems.

Accordingly, illustrative embodiments are not limited to arrangements in which all such functionality is implemented in first and second storage systems or a host device, and therefore encompass various hybrid arrangements in which the functionality is distributed over one or more storage systems and one or more associated host devices, each comprising one or more processing devices.

As another example, it is possible in some embodiments that the first storage system and the second storage system can comprise the same storage system. In such an arrangement, a replication process is illustratively implemented to replicate data from one portion of the storage system to another portion of the storage system. The terms "first storage system" and "second storage system" as used herein are therefore intended to be broadly construed so as to encompass such possibilities. For example, the first and second storage systems can comprise respective different storage arrays of a larger storage system.

The operation of the information processing system 100 will now be described in further detail with reference to the flow diagram of the illustrative embodiment of FIG. 2, which implements a process for lock contention resolution during replication journal recovery in conjunction with ongoing active-active replication.

The process as illustrated in FIG. 2 includes steps 200 through 218, and is suitable for use in system 100 but is more generally applicable to a wide variety of other types of information processing systems comprising first and second storage systems implementing functionality for lock contention resolution during replication journal recovery. The process as illustrated is illustratively performed by one of two storage systems interacting with the other storage system, and vice versa. The storage system performing the process is also referred to as a "primary" storage system, and the other storage system in this context is referred to as operating as a "peer site" relative to the primary storage system performing the process. Different instances of the process are assumed to be performed in each of the storage systems, and in performing its corresponding instance of the process each storage system operates as the primary storage system relative to the other storage system which is considered to be operating as the peer site.

Odd-numbered steps 205, 207, 209, 211 and 213 are shown in dashed outline and are illustratively performed at least in part in parallel with even-numbered steps 200 through 218.

Figure 3A:
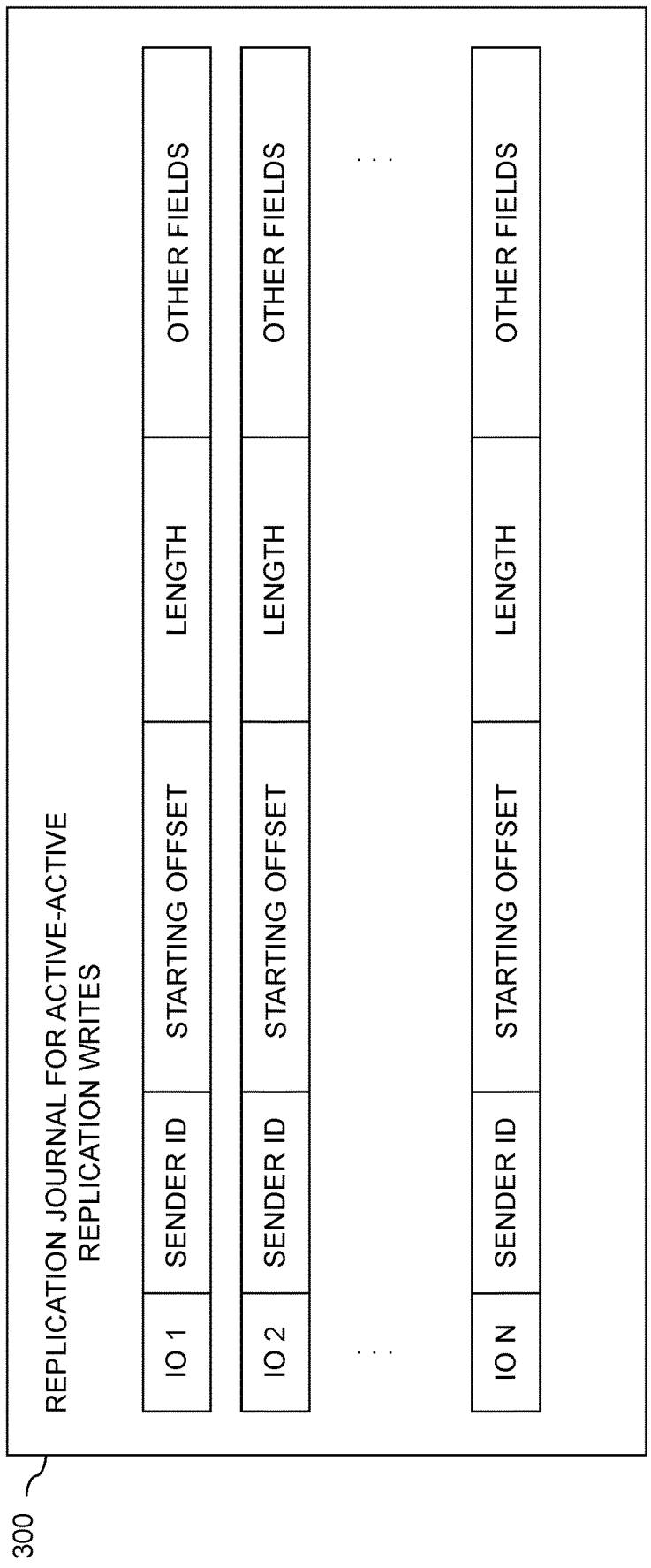

Certain steps of the FIG. 2 process make use of a replication journal and a lock contention table, examples of which can be seen in FIGS. 3A and 3B, respectively.

In step 200, the primary storage system maintains a replication journal for replication writes received by that storage system as part of ongoing active-active replication with another storage system operating as a peer site. For example, the replication write can comprise a write request received in a control module of a distributed storage controller of the primary storage system from a routing module of the distributed storage controller, although numerous other arrangements are possible in other embodiments.

In step 202, a determination is made by the primary storage system as to whether or not an impactful failure has occurred. An "impactful failure" in this context may be any type of failure or other HA event that adversely impacts the replication journal of the primary storage system, such that replication journal recovery is needed. If an impactful failure is detected, the process moves to step 204, and otherwise returns to step 200 as indicated in order to continue maintaining the replication journal.

In step 204, the primary storage system initiates recovery of the replication journal by acquiring any address locks needed to apply journal entries.

In step 206, a recovery write for a selected one of the journal entries is sent by the primary storage system to the other storage system operating as the peer site. In an initial pass through step 206, the selected journal entry is illustratively a first one of the journal entries, and subsequent journal entries are selected in turn in respective additional passes through step 206.

In step 208, a determination is made by the primary storage system as to whether or not the other storage system operating as the peer site has rejected the recovery write due to a lock collision. If the other storage system operating as the peer site has rejected the recovery write, the process moves to step 210, and otherwise moves to step 212 as indicated.

In step 210, the primary storage system releases its address lock for the selected journal entry and updates the lock contention table to include a table entry with a lock contention range and associated journal information including a starting offset and length. The process then moves to step 212 as indicated.

In step 212, which is reached from step 208 if the other storage system operating as the peer site does not reject the recovery write, or from step 210 if the other storage system operating as the peer site does reject the recovery write, a determination is made by the primary storage system as to whether or not all journal entries have attempted recovery. If there is still at least one journal entry left to process, the next journal entry is selected by the primary storage system in step 214, and then steps 206, 208 and possibly 210 are repeated for that next journal entry, and such a sequence of operations may be repeated one or more additional times, if necessary, until such time as step 212 determines that all journal entries have attempted recovery. At this point, the process moves from step 212 to step 216, as indicated.

In step 216, a determination is made as to whether or not the lock contention table maintained by the primary storage system is empty. If the lock contention table is empty, the process moves to step 218, and otherwise returns to step 204 as indicated in order to reinitiate recovery of the replication journal by acquiring any address locks needed in order to apply the journal entries.

In step 218, which is reached after all journal entries have attempted recovery and the lock contention table is empty, journal recovery is marked as complete, and the process returns to step 200 to continue to maintain the replication journal for active-active replication writes.

As noted above, odd-numbered steps 205, 207, 209, 211 and 213 shown in dashed outline are performed in parallel with other portions of the process, generally during journal recovery, and may be repeated multiple times for each of a plurality of other writes received by the primary storage system during journal recovery.

In step 205, a determination is made as to whether or not another write has been received by the primary storage system during journal recovery. Such a write may be, for example, a write associated with a normal IO operation in the primary storage system or another type of IO operation, such as a replication IO operation, received by the primary storage system after initiation of the replication journal recovery in step 204. If such a write is received by the primary storage system, the process moves to step 207, and otherwise remains in step 205 as indicated in order to await receipt of such a write.

In step 207, a determination is made as to whether or not the other received write has a target address range that is a full match with a lock contention range in an entry of the lock contention table. If the other received write is a full match, the process moves to step 209, and otherwise moves to step 211.

In step 209, which is reached if there is a full match between the target address range of the other received write and the lock contention range in a particular table entry, the table entry and corresponding journal entry are cleared, and the process returns to step 205 to await receipt of another write.

In step 211, which is reached in the absence of a full match between the target address range of the other received write and a lock contention range in an entry of the lock contention table, a determination is made as to whether or not the other received write has a target address range that is a partial match with a lock contention range in an entry of the lock contention table. If the other received write is a partial match, the process moves to step 213, and otherwise returns to step 205 to await receipt of another write.

In step 213, which is reached if there is a partial match between the target address range of the other received write and the lock contention range in a particular table entry, the journal entry is modified to include only the non-overlapping portion of the lock contention range, and the process returns to step 205 to await receipt of another write.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for lock contention resolution during replication journal recovery. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another for respective different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controllers 108 of storage systems 102 that are configured to control performance of one or more steps of the FIG. 2 process in their corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controllers 108, as well as other system components, may be implemented at least in part using processing devices of such processing platforms. For example, in a distributed implementation of a given one of the storage controllers 108, respective distributed modules of such a storage controller can be implemented in respective containers running on respective ones of the processing devices of a processing platform.

Examples of a replication journal and a lock contention table suitable for use in the process of FIG. 2 and in other illustrative embodiments herein will now be described with reference to respective FIGS. 3A and 3B.

FIG. 3A shows an example of a replication journal 300 utilized in providing lock contention resolution for active-active replication in accordance with the FIG. 2 process. In this embodiment, the replication journal is illustratively maintained in the form of a table, although other types of data structures can be used in other embodiments.

The replication journal 300 more particularly comprises a plurality of entries for respective replication IO requests, also referred to herein as replication writes, associated with an ongoing active-active replication process. For each of a plurality of replication writes respectively denoted as IO 1, IO 2, . . . IO N, the corresponding entry of the replication journal includes a sender ID, a starting offset and a length. The starting offset and the length for a given one of the entries collectively specify a target address range for the corresponding replication write. Multiple ones of the replication writes can be received from the same sender. The replication journal in some embodiments further includes one or more other fields as indicated. Numerous other types and arrangements of entries and fields can be used, and the term "replication journal" as used herein is therefore intended to be broadly construed.

FIG. 3B shows an example of a lock contention table 302 utilized in providing lock contention resolution for active-active replication in accordance with the FIG. 2 process. In this embodiment, although the lock contention table is illustratively maintained in the form of a table, other types of data structures can be used in other embodiments. The term "lock contention table" as used herein is therefore intended to be broadly construed, as should not be viewed as limited to a particular format or data structure.

The lock contention table 302 more particularly comprises a plurality of entries, illustratively denoted as Entry 1, Entry 2, . . . Entry K, including respective corresponding lock contention ranges denoted Lock Contention Range 1, Lock Contention Range 2, . . . Lock Contention Range K, and associated journal entry information, such as the starting offset and length from a corresponding entry of the replication journal 300, as well as one or more other fields.

Other types of tables or other data structures, having different arrangements and types of entries, can be used to provide a replication journal and a lock contention table in other embodiments herein. Accordingly, the particular arrangements of FIGS. 3A and 3B are shown by way of illustrative example only.

In some embodiments, the storage system comprises a clustered content addressable storage system configured to incorporate functionality for lock contention resolution during replication journal recovery as disclosed herein. A clustered content addressable storage system is also referred to herein as a distributed content addressable storage system.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of a given one of the storage systems 102, and accordingly is assumed to be coupled to the other one of the storage systems 102 and to one or more host devices of a computer system within information processing system 100.

Although it is assumed that both the first storage system 102-1 and the second storage system 102-2 are content addressable storage systems in some embodiments, other types of storage systems can be used for one or both of the first storage system 102-1 and the second storage system 102-2 in other embodiments. For example, it is possible that at least one of the storage systems 102 in an illustrative embodiment need not be a content addressable storage system and need not include an ability to generate content-based signatures.

The storage controller 408 in the present embodiment is configured to implement functionality for lock contention resolution during replication journal recovery, of the type previously described in conjunction with FIGS. 1 through 3B. For example, the content addressable storage system 405 illustratively participates as a first storage system in an active-active replication process with a second storage system that may be implemented as another instance of the content addressable storage system 405.

The storage controller 408 includes distributed modules 412 and 414, which are configured to operate in a manner similar to that described above for respective corresponding replication control logic 112 and lock contention resolution logic 114 of the storage controllers 108 of system 100. Module 412 is more particularly referred to as distributed replication control logic, and illustratively comprises multiple replication control logic instances on respective ones of a plurality of distinct nodes, with the multiple replication control logic instances comprising at least a portion of a replication engine configured to perform process operations associated with active-active replication. Module 414 more particularly comprises distributed lock contention resolution logic with different instances thereof also being implemented on respective ones of the distinct nodes.

Figure 4:
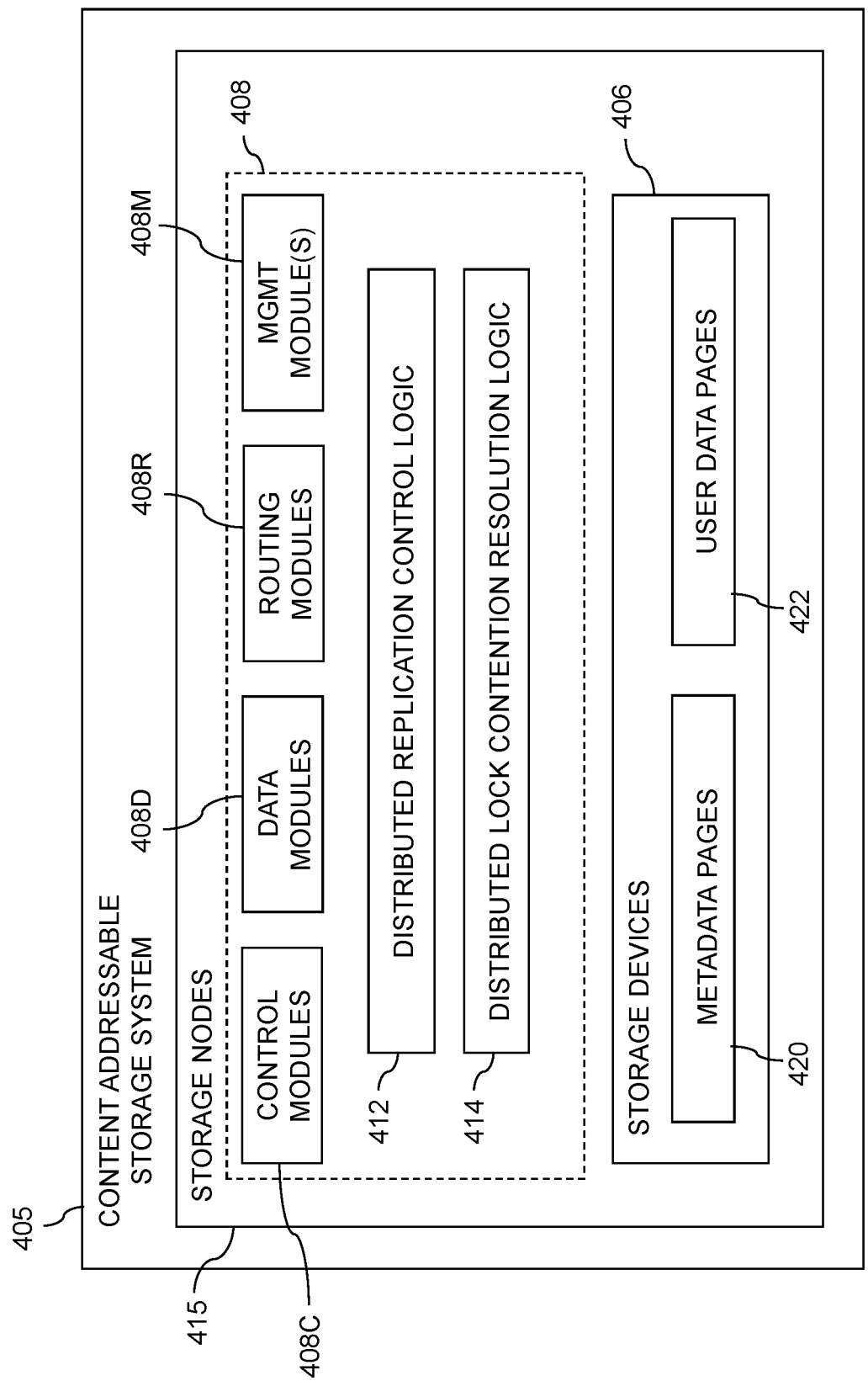
FIG. 4 illustrates a portion of a distributed storage controller of a content addressable storage system showing one possible arrangement implementing lock contention resolution for active-active replication performed in conjunction with replication journal recovery.

The content addressable storage system 405 in the FIG. 4 embodiment is implemented as at least a portion of a clustered storage system and includes a plurality of storage nodes 415 each comprising a corresponding subset of the storage devices 406. Such storage nodes 415 are examples of the "distinct nodes" referred to above, and other clustered storage system arrangements comprising multiple storage nodes and possibly additional or alternative nodes can be used in other embodiments. A given clustered storage system may therefore include not only storage nodes 415 but also additional storage nodes, compute nodes or other types of nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 is referred to as distributed storage controller 408.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415. A given set of processing modules implemented on a particular one of the storage nodes 415 therefore illustratively includes at least one control module 408C, at least one data module 408D and at least one routing module 408R, and possibly a management module 408M.

Communication links may be established between the various processing modules of the distributed storage controller 408 using well-known communication protocols such as TCP/IP and remote direct memory access (RDMA). For example, respective sets of IP links used in data transfer and corresponding messaging could be associated with respective different ones of the routing modules 408R.

Although shown as separate modules of the distributed storage controller 408, the modules 412 and 414 in the present embodiment are assumed to be distributed at least in part over at least a subset of the other modules 408C, 408D, 408R and 408M of the storage controller 408. Accordingly, at least portions of the functionality for lock contention resolution during replication journal recovery of the modules 412 and 414 may be implemented in one or more of the other modules of the storage controller 408. In other embodiments, the modules 412 and 414 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users of the content addressable storage system 405. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume for which content-based signatures are generated using modules 412 and 414 illustratively comprises a set of one or more LUNs, each including multiple ones of the user data pages 422 stored in storage devices 406.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, in a given set of n user data pages representing a portion of the user data pages 422, each of the user data pages is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages having respective signatures. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The functionality for lock contention resolution during replication journal recovery provided by modules 412 and 414 in this embodiment is assumed to be distributed across multiple distributed processing modules, including at least a subset of the processing modules 408C, 408D, 408R and 408M of the distributed storage controller 408.

For example, the management module 408M of the storage controller 408 may include a replication control logic instance that engages corresponding replication control logic instances in all of the control modules 408C and routing modules 408R in order to implement an active-active replication process.

By way of example, in some embodiments, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

The distributed storage controller in this example is configured to group consecutive pages into page groups, to arrange the page groups into slices, and to assign the slices to different ones of the control modules 408C. For example, if there are 1024 slices distributed evenly across the control modules 408C, and there are a total of 16 control modules in a given implementation, each of the control modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The data modules 408D allow a user to locate a given user data page based on its signature. Each metadata page also has a size of 8 KB and includes multiple instances of the <lun_id, offset, signature> for respective ones of a plurality of the user data pages. Such metadata pages are illustratively generated by the control modules 408C but are accessed using the data modules 408D based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the content addressable storage system 405 each illustratively comprise one or more IO operations directing that at least one data item of the storage system 405 be written to in a particular manner. A given write request is illustratively received in the storage system 405 from a host device over a network. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 408C, data modules 408D and routing modules 408R of the storage nodes 415 communicate with one another over a high-speed internal network such as an InfiniBand network. The control modules 408C, data modules 408D and routing modules 408R coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 405 utilizes a two-level mapping process to map logical block addresses to physical block addresses. The first level of mapping uses an A2H table and the second level of mapping uses an HMD table, with the A2H and HMD tables corresponding to respective logical and physical layers of the content-based signature mapping within the content addressable storage system 405. The HMD table or a given portion thereof in some embodiments disclosed herein is more particularly referred to as an H2D table, although it is to be understood that these and other mapping tables or other data structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

Examples of these and other metadata structures utilized in illustrative embodiments were described elsewhere herein. These particular examples illustratively include respective A2H, H2D, HMD and PLB tables. In some embodiments, the A2H and H2D tables are utilized primarily by the control modules 408C, while the HMD and PLB tables are utilized primarily by the data modules 408D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the content addressable storage system 405. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement functionality for lock contention resolution during replication journal recovery in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with functionality for lock contention resolution during replication journal recovery as disclosed herein can provide a number of significant advantages relative to conventional arrangements.

For example, some embodiments advantageously avoid potential deadlocks that might otherwise negatively impact the ability of the storage system to respond to a failure, thereby facilitating the achievement of HA goals in the storage system.

Illustrative embodiments can therefore allow a storage system to continue handling active-active replication IO requests during an HA event, without "tripping" or otherwise interrupting the active-active replication, while also efficiently avoiding potential deadlocks in replication journal recovery, thereby ensuring fast recovery from the HA event. Moreover, such embodiments do not undermine the performance of the storage system in handling normal IO requests not related to active-active replication, or in handling active-active replication IO requests in the absence of any HA events.

Fast and efficient HA recovery is therefore provided during active-active replication with minimal impact on a healthy storage system or non-replication IO use cases.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for lock contention resolution during replication journal recovery will now be described in greater detail with reference to FIGS. 5 and 6. Although described in the context of system 100, these platforms may also be used to implement at least portions of other information processing systems in other embodiments.

Figure 5:
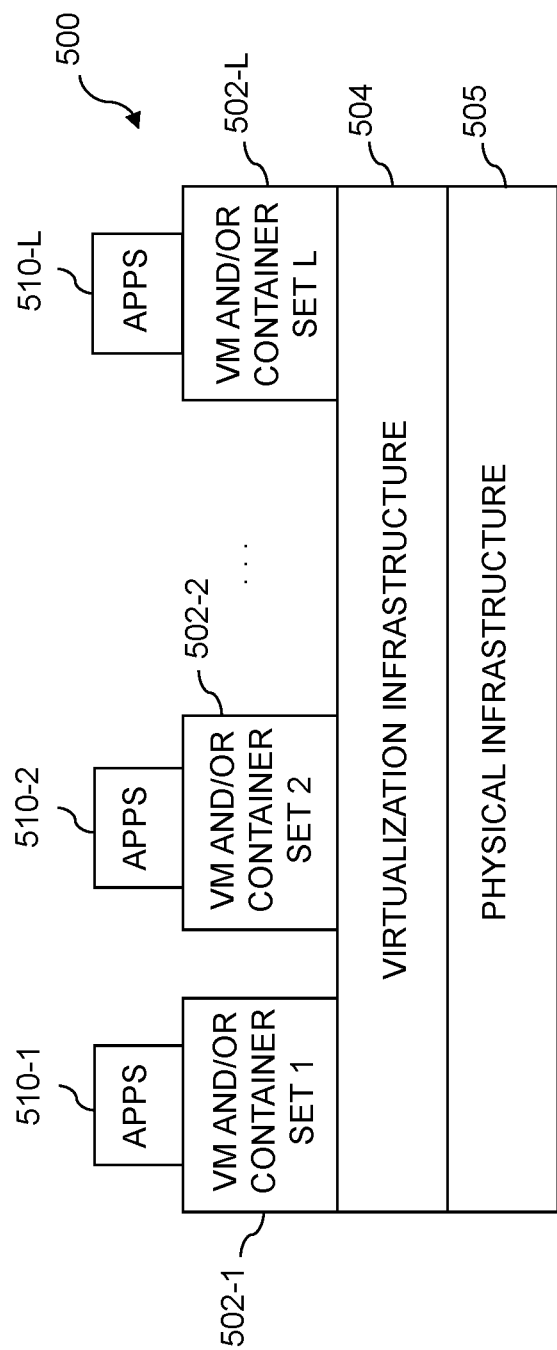
FIGS. 5 and 6 show examples of processing platforms that may be utilized to implement at least a portion of an information processing system in illustrative embodiments.
Figure 6:
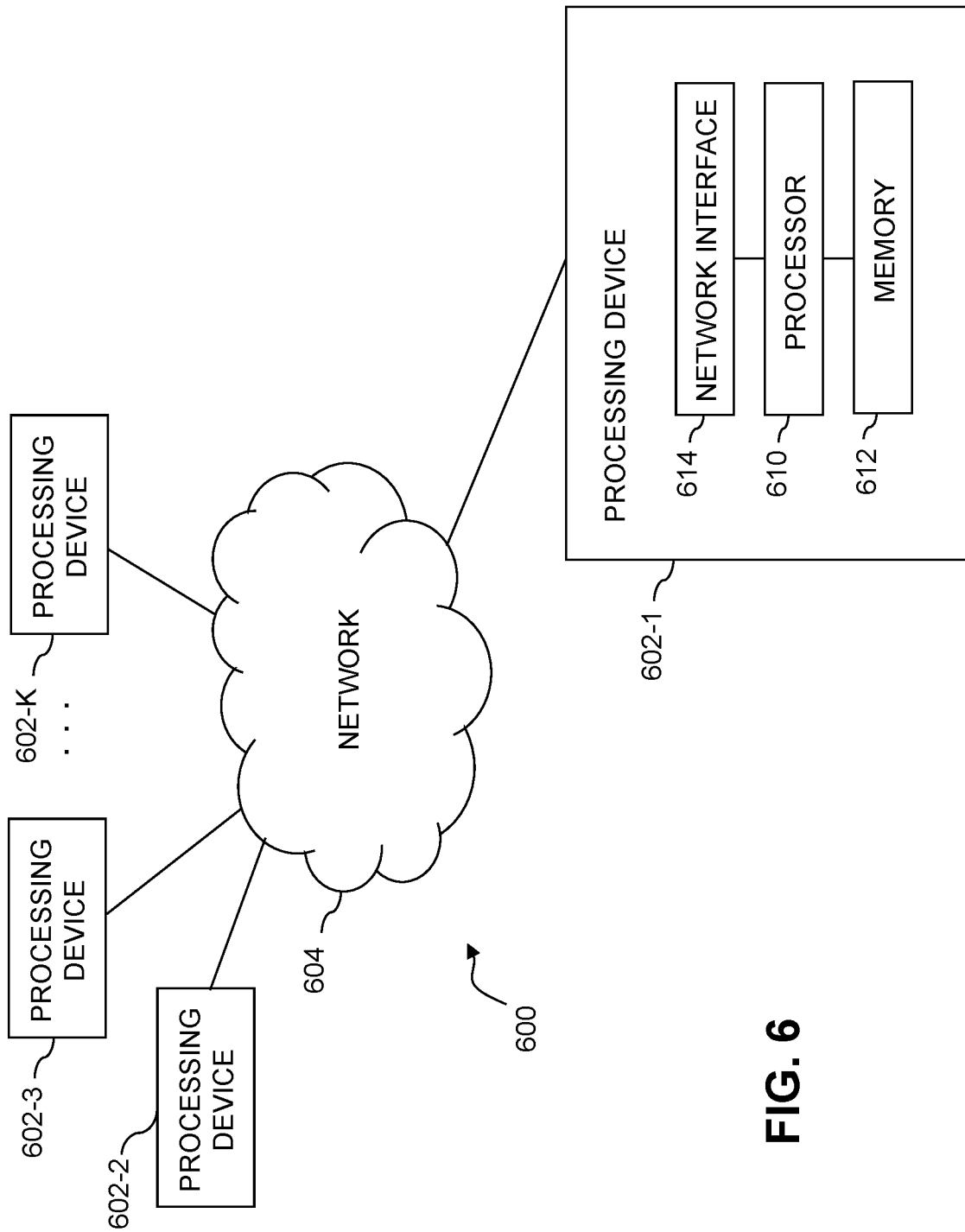

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide functionality for lock contention resolution during replication journal recovery of the type described above, illustratively using one or more processes running on a given one of the VMs. For example, each of the VMs can implement replication control logic instances, lock contention resolution logic instances, and/or other components for supporting functionality for lock contention resolution during replication journal recovery in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide functionality for lock contention resolution during replication journal recovery of the type described above. For example, a container host device supporting multiple containers of one or more container sets can implement one or more instances of replication control logic, lock contention resolution logic and/or other components for supporting functionality for lock contention resolution during replication journal recovery in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell Technologies.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for lock contention resolution during replication journal recovery of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, replication control logic, lock contention resolution logic, replication journals, lock contention tables and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to maintain a replication journal for recording replication write requests in a storage system;
   to detect a failure impacting the replication journal;
   to initiate recovery of the replication journal responsive to the detected failure;
   in conjunction with the recovery of the replication journal, to maintain a lock contention table that characterizes lock contentions between address lock ranges required for the recovery of the replication journal and address lock ranges required by other write requests in the storage system; and
   to utilize the lock contention table to resolve one or more potential deadlocks that would otherwise prevent completion of the recovery of the replication journal;
   wherein a given entry of the replication journal is removed therefrom based at least in part on completion of replication processing for a corresponding one of the replication write requests in an additional storage system.

2. The apparatus of claim 1 wherein said at least one processing device comprises at least a portion of a storage controller of a first storage system, the first storage system being configured to participate in a replication process with a second storage system, and wherein the replication write requests are generated as part of the replication process.

3. The apparatus of claim 2 wherein the first and second storage systems are arranged in an active-active configuration relative to one another for performance of the replication process.

4. The apparatus of claim 1 wherein said at least one processing device comprises a particular one of a plurality of storage nodes of a distributed storage system, each such storage node comprising a set of processing modules configured to communicate with corresponding sets of processing modules on other ones of the storage nodes, the sets of processing modules of the storage nodes of the distributed storage system collectively comprising at least a portion of a distributed storage controller of the distributed storage system.

5. The apparatus of claim 4 wherein different instances of the lock contention table are maintained by different ones of the processing modules of the sets of processing modules of the respective storage nodes of the distributed storage system.

6. The apparatus of claim 1 wherein maintaining the replication journal comprises:
creating a journal entry in the replication journal for a given one of the replication write requests responsive to data of the write request being persisted in a first storage system that receives the write request from a host device; and
removing the journal entry in the replication journal for the given one of the replication write requests responsive to data of the write request being persisted in a second storage system that receives the data from the first storage system.

7. The apparatus of claim 1 wherein initiating recovery of the replication journal comprises:
acquiring address locks needed to apply journal entries of the replication journal; and
performing a replication journal recovery operation by sending a replication write request associated with a selected one of the journal entries from a first storage system to a second storage system.

8. The apparatus of claim 7 wherein responsive to the detected failure, normal processing of other write requests is temporarily interrupted until the address locks needed to apply journal entries of the replication journal are acquired.

9. The apparatus of claim 7 wherein maintaining a lock contention table comprises:
determining whether or not the second storage system rejects the replication write request due to a lock collision; and
responsive to an affirmative determination, releasing a corresponding lock and updating the lock contention table to include a table entry comprising a lock contention range and journal entry information for the selected journal entry.

10. The apparatus of claim 9 wherein the journal entry information associated with the lock contention range in the lock contention table comprises at least an offset and a length for the corresponding replication write request.

11. The apparatus of claim 9 wherein performing a replication journal recovery operation by sending a replication write request associated with a selected one of the journal entries, determining whether or not the second storage system rejects the replication write request due to a lock collision, and responsive to an affirmative determination, releasing the corresponding lock and updating the lock contention table to include a table entry comprising a lock contention range and journal entry information for the selected journal entry, are repeated for each of one or more additional selected journal entries in the replication journal.

12. The apparatus of claim 11 wherein the repeating continues until all journal entries have been selected and processed and the lock contention table is empty.

13. The apparatus of claim 1 wherein utilizing the lock contention table to resolve one or more potential deadlocks that would otherwise prevent completion of the recovery of the replication journal comprises:
for a given one of the other write requests, determining whether or not it has a target data range that at least partially matches a lock contention range in a table entry of the lock contention table;
responsive to the given other write request having a target data range that at least partially matches a lock contention range in a table entry of the lock contention table, checking a data range in a corresponding journal entry of the replication journal;
responsive to a full match between the target data range and the data range in the corresponding journal entry, clearing both the table entry for that lock contention range and the corresponding journal entry; and
responsive to a partial match between the target data range and the data range in the corresponding journal entry, modifying the corresponding journal entry to include only a non-matching portion of the data range.

14. The apparatus of claim 1 wherein utilizing the lock contention table to resolve one or more potential deadlocks that would otherwise prevent completion of the recovery of the replication journal comprises selectively aborting portions of the recovery of the replication journal based at least in part on one or more table entries of the lock contention table in a manner that maintains write order consistency and cross-site consistency for first and second storage systems participating in an active-active replication process.

15. A computer program product comprising a non-transitory processor-readable storage medium having stored therein program code of one or more software programs, wherein the program code when executed by at least one processing device causes said at least one processing device:
maintaining a replication journal for recording replication write requests in a storage system;
detecting a failure impacting the replication journal;
initiating recovery of the replication journal responsive to the detected failure;
in conjunction with the recovery of the replication journal, maintaining a lock contention table that characterizes lock contentions between address lock ranges required for the recovery of the replication journal and address lock ranges required by other write requests in the storage system; and
utilizing the lock contention table to resolve one or more potential deadlocks that would otherwise prevent completion of the recovery of the replication journal;
wherein a given entry of the replication journal is removed therefrom based at least in part on completion of replication processing for a corresponding one of the replication write requests in an additional storage system.

16. The computer program product of claim 15 wherein utilizing the lock contention table to resolve one or more potential deadlocks that would otherwise prevent completion of the recovery of the replication journal comprises:
for a given one of the other write requests, determining whether or not it has a target data range that at least partially matches a lock contention range in a table entry of the lock contention table;
responsive to the given other write request having a target data range that at least partially matches a lock contention range in a table entry of the lock contention table, checking a data range in a corresponding journal entry of the replication journal;
responsive to a full match between the target data range and the data range in the corresponding journal entry, clearing both the table entry for that lock contention range and the corresponding journal entry; and
responsive to a partial match between the target data range and the data range in the corresponding journal entry, modifying the corresponding journal entry to include only a non-matching portion of the data range.

17. The computer program product of claim 15 wherein utilizing the lock contention table to resolve one or more potential deadlocks that would otherwise prevent completion of the recovery of the replication journal comprises selectively aborting portions of the recovery of the replication journal based at least in part on one or more table entries of the lock contention table in a manner that maintains write order consistency and cross-site consistency for first and second storage systems participating in an active-active replication process.

18. A method comprising:
- to maintain a replication journal for recording replication write requests in a storage system;
- to detect a failure impacting the replication journal;
- to initiate recovery of the replication journal responsive to the detected failure;
- in conjunction with the recovery of the replication journal, to maintain a lock contention table that characterizes lock contentions between address lock ranges required for the recovery of the replication journal and address lock ranges required by other write requests in the storage system; and
- to utilize the lock contention table to resolve one or more potential deadlocks that would otherwise prevent completion of the recovery of the replication journal;
- wherein a given entry of the replication journal is removed therefrom based at least in part on completion of replication processing for a corresponding one of the replication write requests in an additional storage system; and
- wherein the method is implemented by at least one processing device comprising a processor coupled to a memory.

19. The method of claim 18 wherein utilizing the lock contention table to resolve one or more potential deadlocks that would otherwise prevent completion of the recovery of the replication journal comprises:
- for a given one of the other write requests, determining whether or not it has a target data range that at least partially matches a lock contention range in a table entry of the lock contention table;
- responsive to the given other write request having a target data range that at least partially matches a lock contention range in a table entry of the lock contention table, checking a data range in a corresponding journal entry of the replication journal;
- responsive to a full match between the target data range and the data range in the corresponding journal entry, clearing both the table entry for that lock contention range and the corresponding journal entry; and
- responsive to a partial match between the target data range and the data range in the corresponding journal entry, modifying the corresponding journal entry to include only a non-matching portion of the data range.

20. The method of claim 18 wherein utilizing the lock contention table to resolve one or more potential deadlocks that would otherwise prevent completion of the recovery of the replication journal comprises selectively aborting portions of the recovery of the replication journal based at least in part on one or more table entries of the lock contention table in a manner that maintains write order consistency and cross-site consistency for first and second storage systems participating in an active-active replication process.

* * * * *